Jan. 18, 1966   A. C. SCHELL   3,230,539
LINEAR ARRAY COUPLED TO STRIP TRANSMISSION LINE WITH
VARIABLE CAPACITANCE DIODES FOR SCANNING
Filed Feb. 12, 1962
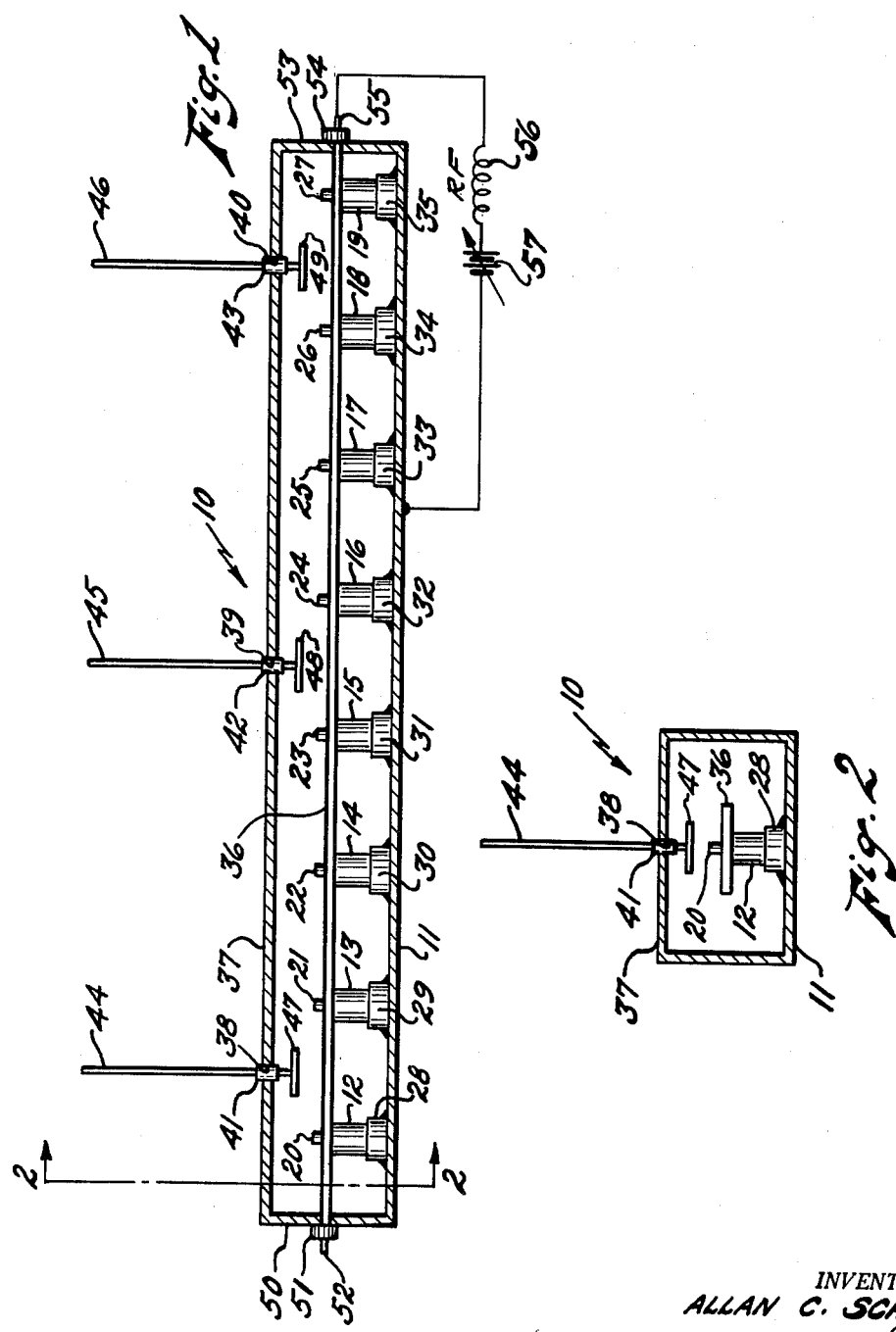
INVENTOR.
ALLAN C. SCHELL
BY
ATTORNEYS though it were a uniform homogenous line with a different value of velocity of propagation and characteristic impedance. The values associated with this representation of the loaded line are denoted by the subscript L, while those of the unloaded line possess the subscript 0.

United States Patent Office 3,230,539
Patented Jan. 18, 1966

3,230,539
LINEAR ARRAY COUPLED TO STRIP TRANSMISSION LINE WITH VARIABLE CAPACITANCE DIODES FOR SCANNING
Allan C. Schell, Medford, Mass., assignor to the United States of America as represented by the Secretary of the Air Force
Filed Feb. 12, 1962, Ser. No. 172,834
3 Claims. (Cl. 343—854)
(Granted under Title 35, U.S. Code (1952), sec. 266)

The invention described herein may be manufactured and used by or for the United States Government for governmental purposes without payment to me of any royalty thereon.

This invention relates to antennae and more particularly to method and means for producing radiation and receptivity antenna patterns which are varied electronically in direction at a very rapid rate.

In the prior art radiation and receptivity antenna patterns whose direction can be controlled has been realized by mechanical means. Essentially, an antenna which produced the aforementioned patterns was rotated in order to provide the necessary directions. The above-mentioned operation is usually referred to as an antenna scanning. However, the mechanical movement of an antenna imposes limitations upon the rate of scanning and also introduces errors resulting from swaying of the mechanical structure. Therefore, the present invention is provided whereby the radiation and receptivity patterns of an antenna are electronically scanned at a rapid rate.

In accordance with the present invention an ultra high frequency transmission line with a voltage variable propagation velocity is utilized. Radiating elements are coupled to the line and a linear array is achieved which has its radiation and receptivity patterns steered by a single control voltage. The array is simple, easy to construct; and the patterns established thereby are capable of very rapid rates of scanning.

One embodiment of the present invention utilizes the principle of the loaded line in combination with the varactor, a silicon junction voltage variable capacitor. By employing these capacitors, an ultra high frequency line with a voltage variable propagation velocity is achieved. When radiating elements are coupled to the line, a linear antenna array is achieved which has its radiation and receptivity pattern steered by a single control voltage.

In a determination of the line parameters, the line is considered to be a uniform homogenous TEM transmission line of characteristic impedance $Z_0$, periodically loaded by lossless reactive elements. This line is divided into unit cells of length $d$, equal to the spacing between the loading elements. Each unit cell therefore is comprised of one loading element, which, for convenience, is chosen to be located at the midpoint of the cell length. A long succession of unit cells are viewed from its terminals as though it were a uniform homogenous line with a different value of velocity of propagation and characteristic impedance. The values associated with this representation of the loaded line are denoted by the subscript L, while those of the unloaded line possess the subscript 0.

The equation relating to the propagation velocity of the loaded line to its parameters is $$\cos \theta_L = \cos \theta_0 - \beta \sin \theta_0$$

where $\theta_L$ is the phase difference ($k_L d$) between input and output of a loaded cell, $\theta_0$ is the phase difference between the same length of line with no loading, and $$\beta = \frac{B}{2Y_0}$$

where B is the susceptance of the loading element. The apparent characteristic impedance of the loaded line when viewed only from the terminals of the unit cell is given by $$Z_L = Z_0 \sqrt{\frac{1 - \beta \tan \frac{\theta_0}{2}}{1 + \beta \cot \frac{\theta_0}{2}}}$$

These relations are sufficient to determine the voltage standing wave ratio associated with a particular loading of a line.

For the determination of the characteristics of a particular loaded line, the aforementioned equations may be used to draw curves showing the relation between characteristic impedance and propagation velocity as a function of loading susceptance and spacing. The behavior of the line as a function of frequency may be found, and the foregoing characteristics of the loading element may be prescribed in order to satisfy some desired dispersion requirement.

An object of the present invention is to provide method and means for producing radiation and receptivity antenna patterns which are steered electronically in direction at a very rapid rate.

Another object of the present invention is to provide method and means for producing radiation and receptivity antenna patterns which utilizes a single control voltage to achieve rapid rates of electronic pattern scanning.

Still another object of the present invention is to provide an ultra high frequency transmission line having a voltage variable propagation velocity in combination with radiating and receiving elements coupled to the aforesaid line.

Yet another object of the present invention is to provide an antenna array having radiating elements coupled to a double ground plate stripline wherein the aforesaid stripline is loaded with voltage variable capacitance elements.

The various features of novelty which characterize this invention are pointed out with particularity in the claims annexed to and forming a part of this specification. For a better understanding of this invention, however, its advantages and specific objects obtained with its use, reference should be had to the accompanying drawings and descriptive matter in which is illustrated and described a preferred embodiment of the invention.

In the drawings:
FIGURE 1 is an elevation view partly in section of the preferred embodiment of the present invention; and
FIGURE 2 is a cross-sectional view at 2—2 of FIGURE 1.

Now referring in detail to FIGURE 2 there is shown rectangular wave guide 10 which serves as a transmission line. There is also shown loading element 12 which is comprised of a silicon junction voltage variable capacitor such as the conventionally known varactor. Loading element 12 has two terminals 20 and 28. Terminal 28 is soldered to bottom member 11. Plate 36 is comprised of a rectangular metal member and is affixed firmly to loading element 12 by soldering terminal 20 thereto. Therefore, it is seen that loading element 12, a varactor, has two terminals 20 and 28. Terminal 20 is connected and attached to center plate 36 and terminal 28 is connected and attached to bottom member 11.

Upper member 37 of wave guide 10 has hole 38 drilled therethrough. Insulating sleeve 41 is pressure fitted in hole 38. Radiating element 44 is pressure fitted into insulating sleeve 41 and coupling element 47 is soldered to radiating element 44. Coupling element 47 is comprised of a rectangular sheet of metal.

Now referring in detail to FIGURE 1, there is shown bottom and top rectangular metal members 11 and 37, respectively, which are referred to as the ground planes and which are electrically ground on the low side of the circuit. Center rectangular metal plate 36 is soldered to varactors 12–19 at terminals 20–27, respectively. Bottom rectangular metal member 11 is soldered to varactors 12–19 at terminals 28–35, respectively. Varactors 12–19 are evenly spaced. Evenly spaced holes 38–40 are drilled in top rectangular metal member 37 into which are pressure fitted insulating sleeves 41–43, respectively. Into insulating sleeves 41–43, respectively, are pressure fitted rectangular radiating elements 44–46, respectively. Rectangular metal coupling elements 47–49 are soldered to radiating elements 44–46, respectively. End rectangular metal member 50 of wave guide 10 has input connector 51 attached thereto. Center conductor 52 of input connector 51 is soldered to center metal rectangular plate 36. End rectangular metal member 53, of waveguide 10 has connector 54 attached thereto. Center conductor 55 of connector 54 is soldered to center plate 36. One terminal of variable direct current voltage source 57 is connected to center conductor 55 by way of radio frequency choke 56. The other terminal of voltage source 57 is connected to bottom member 11. It is to be noted that the combination of rectangular metal members 11 and 37 and center plate 36 comprises a strip transmission line with members 11 and 37 being the ground planes thereof. The aforesaid strip transmission line is also referred to as a stripline and as a double ground plane stripline.

In the operation of the preferred embodiment of the invention as shown in FIGURE 2, energy from a source such as a transmitter is fed into wave guide 10 by way of input connector 51. Wave guide 10 serves as a transmission line. This energy travels down the transmission line, small amounts thereof being coupled out by elements 47, 48 and 49 to radiating elements 44, 45 and 46, respectively. Radiating elements 44, 45 and 46 are so spaced that a particular radiation pattern is produced. When the bias voltage from voltage source 57, impressed between center plate 36 and the ground planes represented by members 11 and 37 is changed, then the values of voltage variable capacitance elements 12–19 change and this varies the velocity of energy propagation along the line. This causes a progressive phase shift along the line, and the direction of the radiation pattern of radiating elements 44–46 varies accordingly. Thus, by simply varying the voltage from voltage source 57, the direction of the radiation pattern produced by the radiating elements may be rotated or swung. The radiating elements shown in the preferred embodiment as monopoles may be replaced by dipoles, helices, horns or other arrays. The varactors, voltage variable capacitance elements, may be replaced by diodes, cylinders, or a thin strip of ferro-electric material, and they may be biased separately to produce special radiation patterns.

Thus it is seen that the preferred embodiment of the invention provides an antenna having three monopoles capacitively coupled to a section of double ground plane stripline. The stripline is loaded with varactors at evenly spaced intervals. The center plate is isolated from the ground plane so that the varactor bias voltage may be applied directly to the line. The varactors are simply mounted with the base terminal held in the ground plane and the terminal cap inserted into the center plate and soldered thereto. Probes, in the form of coupling elements, capacitively coupled to the stripline are directly connected to the monopoles. The monopoles are mounted vertically above the upper ground plane. The monopoles form an antenna array which upon the receipt of radiant energy produce a uniform illumination pattern with a preselected bandwidth. This beam is then moved in azimuthal direction by varying the bias voltage. The radiation pattern remains unchanged during the scanning period. Thus it is seen that a single control over a scan coordinate is achieved, that is, one control voltage controls the entire linear antenna array. Therefore, the need for individual phase shift in each radiating element is eliminated. In addition thereto, the construction technique represents a much simpler and more economical method of electronic scanning of antenna radiation patterns. It is also to be noted that with the use of diodes, an extremely rapid rate of radiation pattern scan or variation can be realized.

While in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may be used to advantage without a corresponding use of other features.

Having now described my invention, what I claim as new and desire to secure by Letters Patent is:

1. An antenna system with variable directional scanning characteristics comprising a strip transmission line having a double ground plane with a center plate disposed therebetween, voltage variable capacitance elements evenly spaced in said strip transmission line, each of said capacitance elements being connected between one of said ground planes and said center plate, a multiplicity of selectively spaced antenna radiating elements capacitively coupled to said center plate, each of said radiating elements extending out vertically from said other ground plane, and means to simultaneously vary the voltage applied to said variable capacitance elements.

2. An antenna system with variable directional scanning characteristics comprising a strip transmission line having a double ground plane with a center plate disposed therebetween, a multiplicity of voltage variable capacitance elements evenly spaced in said strip transmission line, each of said capacitance elements being connected between said center plate and one of said ground planes, a multiplicity of selectively spaced radiating elements positioned and insulated on the other of said ground planes and extending vertically outward therefrom, means to capacitively couple each of said radiating elements to said center plate, and means including one of said double ground planes and said center plate to vary the voltage applied to said voltage variable capacitance elements.

3. An antenna system with variable directional scanning characteristics comprising a strip transmission line with a connector at the input thereof to receive radiant energy and having a double ground plane with a center plate disposed therebetween, a multiplicity of voltage variable capacitance elements evenly spaced in said transmission line, each of said capacitance elements being electrically connected between said center plate and one of said ground planes, a multiplicity of selectively spaced radiating elements mounted vertically above the other of said ground planes and insulated therefrom, a probe for each of said radiating elements, in the form of a coupling element, capacitively coupled to said center plate and directly electrically connected to said radiating element, and means including one of said double ground planes and said center plate to vary simultaneously the voltage applied to said voltage variable capacitance elements.

References Cited by the Examiner

UNITED STATES PATENTS

| | | | |
|---|---|---|---|
| 2,808,584 | 10/1957 | Kock | 343—771 X |
| 2,913,686 | 11/1959 | Fubini et al. | 333—84 |
| 2,959,783 | 11/1960 | Iams | 343—100 |
| 2,994,874 | 8/1961 | Kihn et al. | 343—768 |
| 3,044,066 | 7/1962 | Butler | 343—771 |
| 3,107,335 | 10/1963 | Hunton et al. | 333—95 X |
| 3,109,152 | 10/1963 | Dachert | 307—88.5 |

HERMAN KARL SAALBACH, *Primary Examiner.*

CHESTER L. JUSTUS, *Examiner.*

E. LIEBERMAN, M. KRAUS, *Assistant Examiners.*